US007193380B2

(12) United States Patent
Stout et al.

(10) Patent No.: US 7,193,380 B2
(45) Date of Patent: Mar. 20, 2007

(54) METHOD FOR ROTATING A PRINTER PAPER-FEED ROLLER

(75) Inventors: Barry Baxter Stout, Lexington, KY (US); John Thomas Writt, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 725 days.

(21) Appl. No.: 10/461,841

(22) Filed: Jun. 13, 2003

(65) Prior Publication Data

US 2004/0253004 A1 Dec. 16, 2004

(51) Int. Cl.
*H02P 3/18* (2006.01)
*B41J 11/42* (2006.01)
*B41J 29/38* (2006.01)

(52) U.S. Cl. ...................... 318/373; 318/757; 318/763; 318/432; 318/466; 400/582; 400/709; 271/256; 271/258.01

(58) Field of Classification Search ..................... None
See application file for complete search history.

(56) References Cited

U.S. PATENT DOCUMENTS 5,329,339 A 7/1994 Sakamoto et al.
5,642,145 A 6/1997 Tanaka et al.
5,779,378 A 7/1998 Kikuchi
5,839,046 A 11/1998 Takano et al.
6,483,270 B1 * 11/2002 Miyazaki et al. ........... 318/700
6,493,523 B2 12/2002 Weaver
6,607,458 B2 * 8/2003 Downing et al. ........... 474/102
6,823,132 B2 * 11/2004 Saito et al. ................. 318/685
6,842,602 B2 * 1/2005 Kudo ......................... 399/303
6,873,129 B1 * 3/2005 Leverett et al. ............. 318/605
6,930,458 B2 * 8/2005 Akiyama et al. ........... 318/376
6,949,896 B2 * 9/2005 Andoh et al. ............... 318/135
7,014,378 B2 * 3/2006 Saito et al. ................. 400/582
2002/0168193 A1 11/2002 Weaver
2003/0184002 A1 * 10/2003 Akiyama et al. ........... 271/110
2003/0184248 A1 * 10/2003 Muroi et al. ................ 318/466
2004/0119778 A1 * 6/2004 Naito .......................... 347/37
2004/0246290 A1 * 12/2004 Hayashi et al. ............... 347/19
2005/0095050 A1 * 5/2005 Saito et al. ................. 400/611
2005/0214010 A1 * 9/2005 Kietzman et al. ............. 399/68

* cited by examiner

*Primary Examiner*—Lincoln Donovan
*Assistant Examiner*—Eduardo Colon
(74) *Attorney, Agent, or Firm*—Thompson Hine LLP

(57) ABSTRACT

A method for rotating a printer paper-feed roller wherein the roller is driven by a DC (direct current) motor. A feedback-control signal is applied to the motor until the roller reaches a desired rotational position. The feedback-control signal is a function of an error signal, and the error signal represents the difference between the actual rotational position and the desired rotational position of the roller. When the roller reaches the desired rotational position, the applied feedback-control signal is removed from the motor, and a direct-control biasing signal is applied to the motor to reduce or prevent rollback of the roller when the feedback-control signal is removed from the motor. In one example, the signals are PWM (pulse-width-modulated) signals.

25 Claims, 1 Drawing Sheet

METHOD FOR ROTATING A PRINTER PAPER-FEED ROLLER

TECHNICAL FIELD

The present invention relates generally to printers, and more particularly to a method for rotating a printer paper-feed roller.

BACKGROUND OF THE INVENTION

Printers include those printers, such as inkjet printers, having a paper-feed roller which rotates (indexes) to a desired rotational position to advance a paper (or other type of print medium) sheet, such as to advance a paper sheet between print swaths printed by a print head mounted on a carrier system. In a known design, a DC (direct current) motor is used to drive the paper-feed roller. An output signal, such as a PWM (pulse-width-modulated) output voltage signal, from a paper-feed controller, such as a proportional or a PI (proportional integral) or a PID (proportional integral derivative) controller, is used to control the motor. Typically, the controller is used in a feedback control system wherein an encoder measures the actual rotational position of the paper-feed roller and wherein the error signal between the actual rotational position (measured by the encoder) and the desired rotational position is used as the input to the controller.

In one known mode of operation, once the paper-feed roller reaches the desired rotational position, the controller shuts the motor off. However, in this one mode, the quick release of the trapped energy in the gear train and the motor tends to roll back the paper-feed roller away from its desired rotational position.

In another known mode of operation, the controller remains active even after the paper-feed roller reaches the desired rotational position. However, in this other mode, there is a large amount of processor overhead in continuing feedback control while printing. Also, in this other mode, it is difficult to filter out roller feedback caused by carrier vibrations, wherein such feedback tends to be amplified by the paper-feed controller.

What is needed is an improved method for rotating a printer paper-feed roller.

SUMMARY OF THE INVENTION

A first method of the invention is for rotating a printer paper-feed roller wherein the roller is driven by a DC (direct current) motor. The first method includes steps a) and b). Step a) includes applying a feedback-control signal to the motor until the roller reaches a desired rotational position, wherein the feedback-control signal is a function of an error signal, and wherein the error signal represents the difference between the actual rotational position and the desired rotational position of the roller. Step b) includes, when the roller reaches the desired rotational position, removing the applied feedback-control signal from the motor and applying a direct-control biasing signal to the motor to reduce or prevent rollback of the roller when the feedback-control signal is removed from the motor.

A second method of the invention is for rotating a printer paper-feed roller wherein the roller is driven by a DC (direct current) motor. The second method includes steps a) through c). Step a) includes applying a PWM (pulse-width-modulated) feedback-control voltage signal to the motor until the roller reaches a desired rotational position, wherein the feedback-control voltage signal has a substantially constant PWM amplitude and a substantially constant PWM frequency. Step b) includes, when the roller reaches the desired rotational position, removing the applied feedback-control voltage signal from the motor and applying a PWM direct-control biasing voltage signal to the motor to reduce or prevent rollback of the roller when the feedback-control voltage signal is removed from the motor, wherein the direct-control biasing voltage signal has substantially the same PWM amplitude and frequency as that of the feedback-control voltage signal, and wherein the direct-control biasing voltage signal has a substantially constant duty cycle. Step c) includes reducing the duty cycle of the direct-control biasing voltage signal to a new substantially constant value if the roller overshoots the desired rotational position, by a predetermined amount.

A third method of the invention is for rotating a printer paper-feed roller wherein the roller is driven by a DC (direct current) motor. The third method includes steps a) through c). Step a) includes applying a PWM (pulse-width-modulated) feedback-control voltage signal to the motor until the roller reaches a desired rotational position, wherein the feedback-control voltage signal has a substantially constant PWM amplitude and a substantially constant PWM frequency. Step b) includes, when the roller reaches the desired rotational position, removing the applied feedback-control voltage signal from the motor and applying a PWM direct-control biasing voltage signal to the motor to reduce or prevent rollback of the roller when the feedback-control voltage signal is removed from the motor, wherein the direct-control biasing voltage signal has substantially the same PWM amplitude and frequency as that of the feedback-control voltage signal, and wherein the direct-control biasing voltage signal has a substantially constant duty cycle. Step c) includes removing the applied direct-control biasing voltage signal if the roller overshoots the desired rotational position, by a predetermined amount.

Several benefits and advantages are derived from one or more of the methods of the invention. The small biasing force, applied by the direct-control biasing signal to the roller motor, reduces or prevents rollback of the printer paper-feed roller when the feedback-control signal applied to the roller motor is removed when the roller has reached its desired rotational position. Should the roller overshoot the desired rotational position because of the biasing force, any overshoot of the roller past the desired rotational position is kept small by reducing or eliminating the direct-control biasing signal. By removing the feedback-control signal from the motor when the roller reaches the desired rotational position, the problems of keeping the feedback-control signal are eliminated such as having a large amount of processor overhead in continuing feedback control while printing and such as the difficulty of trying to filter out roller feedback caused by carrier vibrations, wherein such feedback tends to be amplified by the paper-feed controller.

DETAILED DESCRIPTION

For purposes of describing the invention, the term "printer" includes, without limitation, a computer printer (such as a computer inkjet printer), a copier, and a facsimile machine. Also, the expression "printer paper-feed roller" means a roller capable of feeding paper and/or another type of print medium in a printer.

Figure 1:
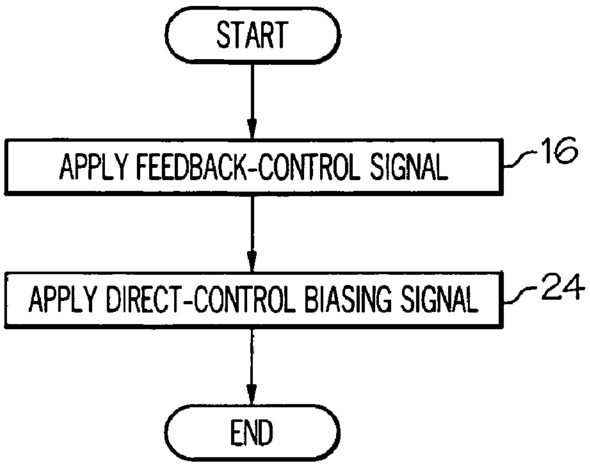
FIG. 1 is a flow chart of a first method of the invention.
Figure 2:
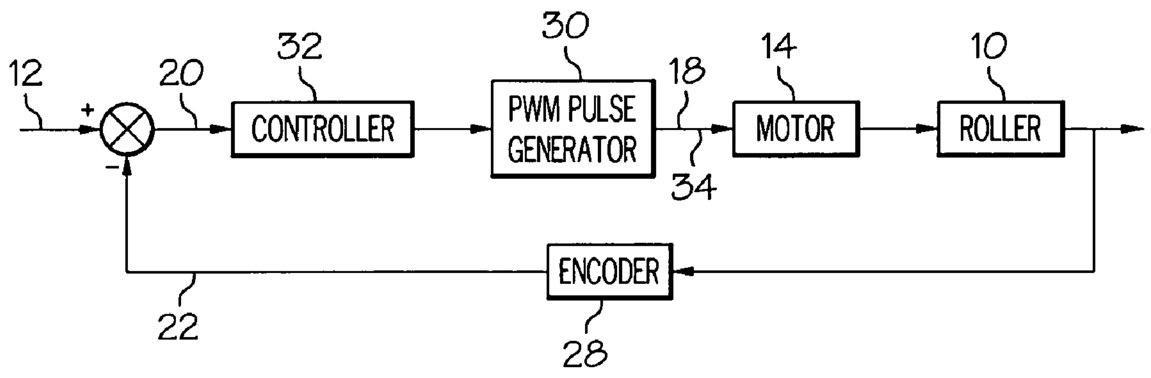
FIG. 2 is a schematic block diagram of an embodiment of apparatus configured to perform one of the steps of the first method of FIG. 1.
Figure 3:
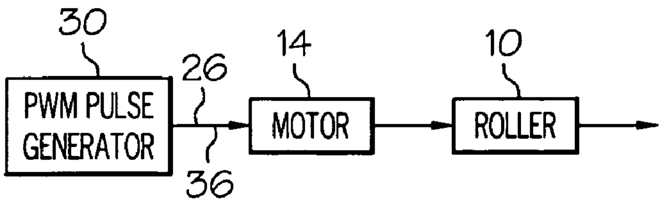
FIG. 3 is a schematic block diagram of some of the apparatus of FIG. 2 configured to perform another of the steps of the first method of FIG. 1.

Referring to FIGS. 1–3, a first method of the invention is for rotating a printer paper-feed roller 10 wherein the roller 10 is driven by a DC (direct current) motor 14. The first method includes steps a) and b). Step a) is labeled as "Apply Feedback-Control Signal" in block 16 of FIG. 1, and an embodiment of apparatus configured to perform step a) is shown in FIG. 2. Step a) includes applying a feedback-control signal 18 to the motor 14 until the roller 10 reaches a desired rotational position (represented by signal 12), wherein the feedback-control signal 18 is a function of an error signal 20, and wherein the error signal 20 represents the difference between the actual rotational position (represented by signal 22) and the desired rotational position of the roller 10. Step b) is labeled as "Apply Direct-Control Biasing Signal" in block 24 of FIG. 1, and some of the apparatus of FIG. 2 configured to perform step b) is shown in FIG. 3. Step b) includes, when the roller 10 reaches the desired rotational position, removing the applied feedback-control signal 18 from the motor 14 and applying a direct-control biasing signal 26 to the motor 14 to reduce or prevent rollback of the roller 10 when the feedback-control signal 18 is removed from the motor 14. It is noted that "rollback of the roller" means rollback of the roller from the desired rotational position.

In one enablement of the first method, step b) applies the direct-control biasing signal whether or not rollback of the roller occurs. In one application of the first method, there is also included the step of determining when the roller 10 reaches the desired rotational position using a rotary encoder 28. In the same or a different application, there is also included the step of initiating a hardware interrupt signal when the roller reaches the desired rotational position. In the same or a different application, the direct-control biasing signal 26 is chosen (empirically and/or mathematically) to prevent rollback of the roller 10 when the feedback-control signal 18 is removed from the motor 14. In one deployment, the direct-control biasing signal 26 is not substantially constant. In another deployment, the direct-control biasing signal 26 is substantially constant. In one illustration, the signals 18 and/or 26 are PM (pulse-modulated) signals. One type of PM signal is a PWM (pulse-width-modulated) signal. In one example, the direct-control biasing signal 26 has a one-percent duty cycle. Other types of PM signals include, without limitation, pulse-frequency-modulated signals, pulse-height-modulated signals, and signals which are combinations of different types of PM signals. In another illustration, the signals 18 and/or 26 are non-PM signals.

In one implementation of the first method, there is also included the step of reducing the direct-control biasing signal 26 if the roller 10 overshoots the desired rotational position by a predetermined amount. In one case, there is also included the step of initiating a hardware interrupt signal when the roller 10 overshoots the desired rotational position by the predetermined amount. In one example, the direct-control biasing signal 26 is a PWM signal and is reduced to having a one-half-percent duty cycle. In the same or a different example, the predetermined amount is 1/2400 of an inch. In one embodiment, a hardware interrupt is triggered when the rotary encoder 28 determines that the roller 10 has moved 1/2400 of an inch beyond the desired rotational position so that the direct-control biasing signal 26 can be reduced to one-half-percent duty cycle. In one employment, the direct-control biasing signal 26 is substantially constant when the roller 10 is between the desired rotational position and a rotational position which overshoots the desired rotational position by the predetermined amount. In one variation, the direct-control biasing signal 26 is reduced to zero if the roller 10 overshoots the desired rotational position by the predetermined amount.

In another implementation of the first method, there is also included the step of reducing the direct-control biasing signal 26 each time the roller 10 overshoots the desired rotational position by one of a plurality P of predetermined amounts. In one case, there is also included the step of initiating a hardware interrupt signal when the roller 10 overshoots the desired rotational position by each one of the plurality P of predetermined amounts. In one variation, the plurality of predetermined amounts includes a first amount, a second amount which is twice the first amount, and up to a Pth amount which is P times the first amount. In one modification, the direct-control biasing signal 26 is reduced in half each time it is reduced. In one employment, the direct-control biasing signal 26 is substantially constant when the roller 10 is between a position equal to the desired rotational position and the first smallest one of the plurality of predetermined amounts and a position equal to the desired rotational position and the second smallest one of the plurality of predetermined amounts. In one modification, the direct-control biasing signal 26 is reduced to zero when the roller 10 overshoots the desired rotational position by the largest one of the plurality of predetermined amounts.

As is known to those skilled in the art, a PWM control signal is a series of pulses typically having a constant (pulse) amplitude, a constant (pulse) frequency (which is the reciprocal of the period of the pulses), and a variable pulse width. The ratio of the pulse width (the "ON" time of a pulse) to the pulse period is called the duty cycle and is usually expressed as a percentage. In one employment of the first method, the direct-control biasing signal 26 and the feedback-control signal 18 are PWM signals having substantially the same PWM amplitude and substantially the same PWM frequency. In the same or a different employment, the direct-control biasing signal 26 has a duty cycle of five percent or less.

In one embodiment of the first method, a PWM pulse generator 30 generates the feedback-control signal 18 from the output of a controller 32 whose input is the error signal 20 as seen in FIG. 2. In one illustration, the controller 32 is a proportional controller or a PI (proportional integral) controller or a PID (proportional integral derivative) controller as is known in the art. In one variation, the same PWM pulse generator 30 generates the direct-control biasing signal 26 as seen in FIG. 3. In one modification, the PWM pulse generator 30 is a part of the controller 32. Apparatus and configurations thereof for implementing the first method, other than what is shown in FIGS. 2 and 3, are left to the artisan.

A second method of the invention is for rotating a printer paper-feed roller 10 wherein the roller 10 is driven by a DC (direct current) motor 14. The second method includes steps a) through c). Step a) includes applying a PWM (pulse-width-modulated) feedback-control voltage signal 34 to the motor 14 until the roller 10 reaches a desired rotational position, wherein the feedback-control voltage signal 34 has a substantially constant PWM amplitude and a substantially constant PWM frequency. Step b) includes, when the roller 10 reaches the desired rotational position, removing the applied feedback-control voltage signal 34 from the motor and applying a PWM direct-control biasing voltage signal 36 to the motor 14 to reduce or prevent rollback of the roller 10 when the feedback-control voltage signal 34 is removed from the motor, wherein the direct-control biasing voltage signal 36 has substantially the same PWM amplitude and frequency as that of the feedback-control voltage signal 34, and wherein the direct-control biasing voltage signal 36 has a substantially constant duty cycle. Step c) includes reducing the duty cycle of the direct-control biasing voltage signal 36 to a new substantially constant value if the roller 10 overshoots the desired rotational position, by a predetermined amount.

In one application of the second method, there are also included the steps of determining when the roller 10 reaches the desired rotational position using a rotary encoder 28 and initiating a hardware interrupt signal when the roller reaches the desired rotational position. In the same or a different application, a single PWM pulse generator 30 is used to apply the feedback-control voltage signal 34 and the direct-control biasing voltage signal 36 to the motor 14.

A third method of the invention is for rotating a printer paper-feed roller 10 wherein the roller 10 is driven by a DC (direct current) motor 14. The third method includes steps a) through c). Step a) includes applying a PWM (pulse-width-modulated) feedback-control voltage signal 34 to the motor 14 until the roller 10 reaches a desired rotational position, wherein the feedback-control voltage signal 34 has a substantially constant PWM amplitude and a substantially constant PWM frequency. Step b) includes, when the roller 10 reaches the desired rotational position, removing the applied feedback-control voltage signal 34 from the motor 14 and applying a PWM direct-control biasing voltage signal 36 to the motor 14 to reduce or prevent rollback of the roller 10 when the feedback-control voltage signal 34 is removed from the motor, wherein the direct-control biasing voltage signal 36 has substantially the same PWM amplitude and frequency as that of the feedback-control voltage signal 34, and wherein the direct-control biasing voltage signal 36 has a substantially constant duty cycle. Step c) includes removing the applied direct-control biasing voltage signal 36 if the roller 10 overshoots the desired rotational position, by a predetermined amount.

In one application of the third method, there are also included the steps of determining when the roller 10 reaches the desired rotational position using a rotary encoder 28 and initiating a hardware interrupt signal when the roller reaches the desired rotational position. In the same or a different application, a single PWM pulse generator 30 is used to apply the feedback-control voltage signal 34 and the direct-control biasing voltage signal 36 to the motor 14.

Several benefits and advantages are derived from one or more of the methods of the invention. The small biasing force, applied by the direct-control biasing signal to the roller motor, reduces or prevents rollback of the printer paper-feed roller when the feedback-control signal applied to the roller motor is removed when the roller has reached its desired rotational position. Should the roller overshoot the desired rotational position because of the biasing force, any overshoot of the roller past the desired rotational position is kept small by reducing or eliminating the direct-control biasing signal. By removing the feedback-control signal from the motor when the roller reaches the desired rotational position, the problems of keeping the feedback-control signal are eliminated such as having a large amount of processor overhead in continuing feedback control while printing and such as the difficulty of trying to filter out roller feedback caused by carrier vibrations, wherein such feedback tends to be amplified by the paper-feed controller.

The foregoing description of several methods of the invention has been presented for purposes of illustration. It is not intended to be exhaustive or to limit the invention to the precise methods disclosed, and obviously many modifications and variations are possible in light of the above teaching. It is intended that the scope of the invention be defined by the claims appended hereto.

What is claimed is:

1. A method for rotating a printer paper-feed roller wherein the roller is driven by a DC (direct current) motor and wherein the method comprises the steps of:

a) applying a feedback-control signal to the motor until the roller reaches a desired rotational position, wherein the feedback-control signal is a function of an error signal, and wherein the error signal represents the difference between the actual rotational position and the desired rotational position of the roller; and b) when the roller reaches the desired rotational position, removing the applied feedback-control signal from the motor and applying a direct-control biasing signal to the motor to reduce or prevent rollback of the roller when the feedback-control signal is removed from the motor.

2. The method of claim 1, also including the step of determining when the roller reaches the desired rotational position using a rotary encoder.

3. The method of claim 1, also including the step of initiating a hardware interrupt signal when the roller reaches the desired rotational position.

4. The method of claim 1, wherein the direct-control biasing signal is chosen to prevent rollback of the roller when the feedback-control signal is removed from the motor.

5. The method of claim 1, wherein the direct-control biasing signal and the feedback-control signal are PWM (pulse-width-modulated) signals having substantially the same PWM amplitude and substantially the same PWM frequency.

6. The method of claim 1, wherein step b) applies the direct-control biasing signal whether or not rollback of the roller occurs.

7. A method for rotating a printer paper-feed roller wherein the roller is driven by a DC (direct current) motor and wherein the method comprises the steps of:

a) applying a feedback-control signal to the motor until the roller reaches a desired rotational position, wherein the feedback-control signal is a function of an error signal, and wherein the error signal represents the difference between the actual rotational position and the desired rotational position of the roller;

b) when the roller reaches the desired rotational position, removing the applied feedback-control signal from the motor and applying a direct-control biasing signal to the motor to reduce or prevent rollback of the roller when the feedback-control signal is removed from the motor, wherein the direct-control biasing signal is chosen to prevent rollback of the roller when the feedback-control signal is removed from the motor, and c) reducing the direct-control biasing signal if the roller overshoots the desired rotational position, by a predetermined amount.

8. The method of claim 7, also including the step of initiating a hardware interrupt signal when the roller overshoots the desired rotational position by the predetermined amount.

9. The method of claim 7, wherein the direct-control biasing signal is substantially constant when the roller is between the desired rotational position and a rotational position which overshoots the desired rotational position by the predetermined amount.

10. The method of claim 7, wherein the direct-control biasing signal is reduced to zero if the roller overshoots the desired rotational position by the predetermined amount.

11. The method of claim 10, also including the step of initiating a hardware interrupt signal when the roller overshoots the desired rotational position by the predetermined amount.

12. A method for rotating a printer paper-feed roller wherein the roller is driven by a DC (direct current) motor and wherein the method comprises the steps of:

a) applying a feedback-control signal to the motor until the roller reaches a desired rotational position, wherein the feedback-control signal is a function of an error signal, and wherein the error signal represents the difference between the actual rotational position and the desired rotational position of the roller;

b) when the roller reaches the desired rotational position, removing the applied feedback-control signal from the motor and applying a direct-control biasing signal to the motor to reduce or prevent rollback of the roller when the feedback-control signal is removed from the motor, wherein the direct-control biasing signal is chosen to prevent rollback of the roller when the feedback-control signal is removed from the motor, and c) reducing the direct-control biasing signal each time the roller overshoots the desired rotational position by one of a plurality of predetermined amounts.

13. The method of claim 12, also including the step of initiating a hardware interrupt signal when the roller overshoots the desired rotational position by each one of the plurality of predetermined amounts.

14. The method of claim 12, wherein the plurality of predetermined amounts includes a first amount, a second amount which is twice the first amount, and up to a last amount which is equal to the plurality of predetermined amounts times the first amount.

15. The method of claim 14, wherein the direct-control biasing signal is reduced in half each time it is reduced.

16. The method of claim 12, wherein the direct-control biasing signal is reduced in half each time it is reduced.

17. The method of claim 12, wherein the direct-control biasing signal is substantially constant when the roller is between a position equal to the desired rotational position and the first smallest one of the plurality of predetermined amounts and a position equal to the desired rotational position and the second smallest one of the plurality of predetermined amounts.

18. The method of claim 12, wherein the direct-control biasing signal is reduced to zero when the roller overshoots the desired rotational position by the largest one of the plurality of predetermined amounts.

19. A method for rotating a printer paper-feed roller wherein the roller is driven by a DC (direct current) motor and wherein the method comprises the steps of:

a) applying a feedback-control signal to the motor until the roller reaches a desired rotational position, wherein the feedback-control signal is a function of an error signal, and wherein the error signal represents the difference between the actual rotational position and the desired rotational position of the roller; and b) when the roller reaches the desired rotational position, removing the applied feedback-control signal from the motor and applying a direct-control biasing signal to the motor to reduce or prevent rollback of the roller when the feedback-control signal is removed from the motor, wherein the direct-control biasing signal and the feedback-control signal are PWM (pulse-width-modulated) signals having substantially the same PWM amplitude and substantially the same PWM frequency, and wherein the direct-control biasing signal has a duty cycle of five percent or less.

20. A method for rotating a printer paper-feed roller wherein the roller is driven by a DC (direct current) motor and wherein the method comprises the steps of:

a) applying a PWM (pulse-width-modulated) feedback-control voltage signal to the motor until the roller reaches a desired rotational position, wherein the feedback-control voltage signal has a substantially constant PWM amplitude and a substantially constant PWM frequency;

b) when the roller reaches the desired rotational position, removing the applied feedback-control voltage signal from the motor and applying a PWM direct-control biasing voltage signal to the motor to reduce or prevent rollback of the roller when the feedback-control voltage signal is removed from the motor, wherein the direct-control biasing voltage signal has substantially the same PWM amplitude and frequency as that of the feedback-control voltage signal, and wherein the direct-control biasing voltage signal has a substantially constant duty cycle; and c) reducing the duty cycle of the direct-control biasing voltage signal to a new substantially constant value if the roller overshoots the desired rotational position. by a predetermined amount.

21. The method of claim 20, also including the steps of determining when the roller reaches the desired rotational position using a rotary encoder and initiating a hardware interrupt signal when the roller reaches the desired rotational position.

22. The method of claim 20, wherein a single PWM pulse generator is used to apply the feedback-control voltage signal and the direct-control biasing voltage signal to the motor.

23. A method for rotating a printer paper-feed roller wherein the roller is driven by a DC (direct current) motor and wherein the method comprises the steps of:

a) applying a PWM (pulse-width-modulated) feedback-control voltage signal to the motor until the roller reaches a desired rotational position, wherein the feedback-control voltage signal has a substantially constant PWM amplitude and a substantially constant PWM frequency;

b) when the roller reaches the desired rotational position, removing the applied feedback-control voltage signal from the motor and applying a PWM direct-control biasing voltage signal to the motor to reduce or prevent rollback of the roller when the feedback-control voltage signal is removed from the motor, wherein the direct-control biasing voltage signal has substantially the same PWM amplitude and frequency as that of the feedback-control voltage signal, and wherein the direct-control biasing voltage signal has a substantially constant duty cycle; and c) removing the applied direct-control biasing voltage signal if the roller overshoots the desired rotational position. by a predetermined amount.

24. The method of claim 23, also including the steps of determining when the roller reaches the desired rotational position using a rotary encoder and initiating a hardware interrupt signal when the roller reaches the desired rotational position.

25. The method of claim 23, wherein a single PWM pulse generator is used to apply the feedback-control voltage signal and the direct-control biasing voltage signal to the motor.

* * * * *